C. H. STEMPEL.
SHUTTER RELEASER.
APPLICATION FILED MAY 16, 1912.
1,044,938.
Patented Nov. 19, 1912.
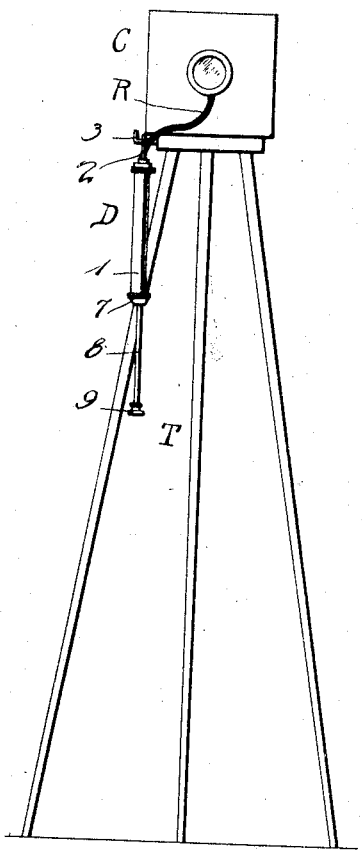
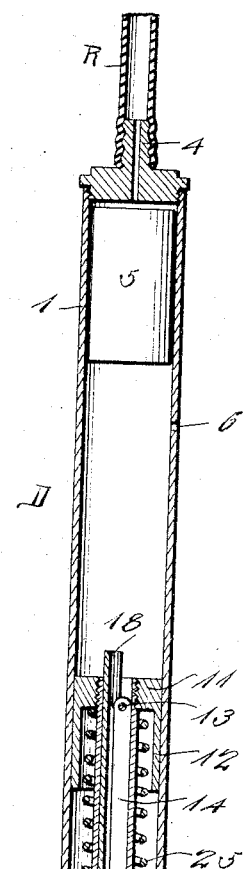
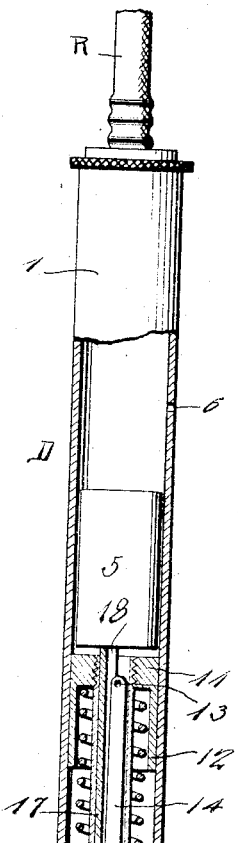
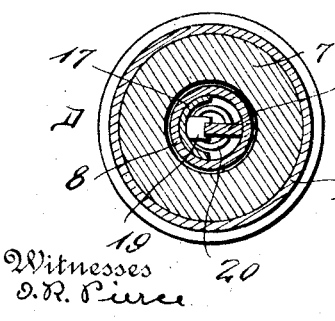
Witnesses
O. R. Pierce
N. L. Collamer
Inventor
C. H. Stempel
by 
Attorneys

UNITED STATES PATENT OFFICE.

CARL H. STEMPEL, OF FORT MADISON, IOWA.

SHUTTER-RELEASER.

1,044,938.  Specification of Letters Patent.  Patented Nov. 19, 1912.

Application filed May 16, 1912. Serial No. 697,892.

*To all whom it may concern:*

Be it known that I, CARL H. STEMPEL, a citizen of the United States, residing at Fort Madison, in the county of Lee and State of Iowa, have invented certain new and useful Improvements in Shutter-Releasers; and I do declare the following to be a full, clear, and exact description of the invention, such as will enable others skilled in the art to which it appertains to make and use the same.

This invention relates to the class of air pumps, and more especially to those having solid pistons; and the object of the same is to replace the ordinary bulb with which a camera shutter is usually equipped, by mechanism capable of being set by the photographer himself and tripped automatically but rather tardily so as to give him an opportunity to get into the group picture about to be taken. However, I desire it understood that while I prefer to put my invention to this use and have so described it in the following specification and claims, it might be otherwise employed with advantage.

The objects of this invention are carried out by the mechanism hereinafter more fully described and claimed, and as shown in the drawings wherein—

Figure 1 is an elevation of a camera, showing this invention as applied thereto. Figs. 2 and 3 are enlarged central vertical sections through the invention alone, showing its parts in different positions. Fig. 4 is a still further enlarged cross section on the line 4—4 of Fig. 2.

In Fig. 1 of the drawings is shown a camera C whose shutter has a pneumatic trip mechanism connected by a rubber hose R with the releasing device D forming the subject matter of the present invention, and when this device is used in this connection its cylindrical barrel 1 is provided with a ring 2 whereby it can be hung on a suitable support such as a pin 3 on the tripod T. The upper end of the barrel is closed and provided with a nipple 4 on which the rubber hose R is slipped. I repeat, however, that this figure is designed to show only one use to which the present invention may be put, and when otherwise employed it might be possible to do away with the ring and the nipple and connect the upper end of the barrel with any object to which a blast of air was desired. Slidably and rather loosely mounted within the barrel is a weighted piston 5 whose descent therein under its own gravity will be limited by the leakage around it, and at a relatively high point in the side of the barrel is formed a vent 6 to admit air to the cylinder, so that after the piston has passed that point and air is admitted the piston drops quickly throughout the remainder of the length of the barrel for a purpose to appear below.

The lower head 7 of the barrel has a central bore through which is slidably mounted a tube 8 having a knob 9 screwed into its lower extremity and a slot 10 in one side for a purpose to appear. The upper end of this tube carries a plunger comprising a ring-shaped head 11 from whose periphery depends a skirt 12 fitting closely within the barrel so that the plunger is guided reliably therein as the knob is moved. Pivotally mounted on a cross pin 13 within the head 11 is a latch 14 which hangs within the tube 8, has a nose 15 adapted to project outward through the slot 10 and its lower end beveled as shown at 14', and the upper end of the latch is beveled as at 16. Slidably mounted also within said tube 8 is a releaser 17 of U-shaped cross section whose upper end 18 projects above the head 11, whose body contains a cam 19 having a beveled face adapted to stand under the beveled end 14' of the latch 14, and whose lower end is supported on a spring 20 which rests upon the plug 9, within the tube 8. Surrounding the tube 8 and resting on the lower cylindrical head 7 is a main spring 25 stronger than the spring 20, the main spring extending up into the skirt 12 of the plunger and bearing against its head 11; and the force of this spring is sufficient to raise the plunger quickly when it is released by disconnection of the nose 15 of the latch from its engagement with the lower cylinder head, and thus to lift the piston.

With this construction of parts, the operation is as follows: The device stands with the plunger and piston at the top of the cylinder; to set it the operator draws the plunger downward by means of the knob until the beveled end of the nose 15 automatically engages under the head 7. There it will be held by the releaser 17 which rises under the expansion of its spring 20 so that the cam 19 engages the beveled lower end 14' of the latch 14 and swings the latter outward around its pivot 13. The oper. or now has some little time to seek his position in a group picture in case he is to make one, the length of the time depending upon the rapidity with which the gravity piston descends as air is admitted above it or leaks past it. In its descent, however, it finally passes the vent 6, and as soon as air is admitted through this vent above the piston the latter falls rapidly. Striking upon the upper end 18 of the releaser 17, this element is caused to descend, thus removing the beveled cam 19 from its position back of the beveled lower end of the latch 14, destroying the support at that point and allowing the engaging edge of the head 7 to slip over the beveled nose 16, which projects through the slot 10, after which the main spring 25 causes the rapid use of the plunger in a manner that will be clear. This carries with it the piston 5, and as soon as the latter passes the vent 6 the air above it is trapped within the upper end of the barrel and forced along the rubber tube R to the camera C where its shutter is released in a manner well understood. Thus it will be seen that I rely upon the slow leakage of air to permit the slow descent of the weighted plunger, and the time that elapses while it is descending to a point where it clears the vent 6 is sufficient for the operator to take his position in the group to be photographed.

The parts of this device may be of any desired size, proportions and materials, and changes in detail may be made without departing from the principle of the invention.

What is claimed as new is:—

1. In a device of the class described, the combination with an upright barrel having a vent in one side, and connections leading from its upper end to the mechanism to which it is attached; of a weighted piston loosely mounted within said barrel, a spring-actuated plunger at the lower end of the latter, a latch for holding the plunger depressed and the spring compressed, and releasing mechanism for tripping the latch by the dropping of the piston.

2. In a device of the class described, the combination with an upright barrel having a vent in one side, and a tube leading from its upper end; of a weighted piston loosely mounted within said barrel, a spring-actuated plunger at the lower end of the latter, a tube depending from said plunger through the lower head of the barrel and having a slot in its side and a knob at its lower end, a latch pivoted at its upper end within said tube and having a lateral nose adapted to project through said notch and engage the lower head of the barrel, yielding means fo normally projecting said nose, and means operated by the fall of the piston for throwing said yielding means out of contact with the latch.

3. In a device of the class described, the combination with an upright barrel having a vent in one side, and a tube leading from the barrel above said vent; of a weighted piston loosely mounted within said barrel, a spring-actuated plunger at the lower end of the latter, a tube depending from said plunger through the lower head of the barrel and having a slot in its side, a latch pivoted within said tube and having a nose adapted to project through said notch and engage the head, the lower end of said latch being beveled inwardly, a releaser movably mounted within said tube alongside the latch and having its upper end projecting above the plunger and adapted to be struck by the falling piston, a cam on said releaser adapted to engage said bevel, and a spring supporting the releaser within the tube and adapted to throw the cam normally into contact with the bevel, for the purpose set forth.

4. In a device of the class described, the combination with an upright barrel having a vent in one side, and a hose communicating with its upper end and led to the mechanism with which it is connected; of a weighted piston loosely mounted within said barrel, an expansive spring mounted on the lower head of the barrel, a plunger slidably mounted in the latter and comprising a head resting on the upper end of the spring and a skirt surrounding it, a tubular plunger rod connected with said head and extending through the spring and the lower head of the barrel and having a slot in its side, a latch within said tube having a nose projecting through the slot and adapted to engage the lower head of the barrel, and means tripped by the fall of the piston for releasing the nose from engagement with said head, for the purpose set forth.

In testimony whereof I have hereunto set my hand in presence of two subscribing witnesses.

CARL H. STEMPEL.

Witnesses:
GEORGE NEDINGTON,
HARRY D. WAGONER.